March 3, 1970     O. F. HAMANN     3,498,694
OPTICAL INTERFERENCE FILTER MEANS BOMBARDED BY CRT BEAM
FOR SELECTIVELY PASSING MONOCHROMATIC LIGHT
Filed Sept. 23, 1966
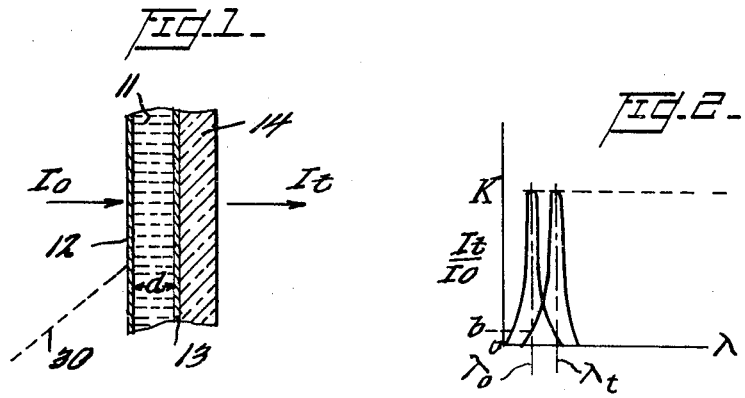
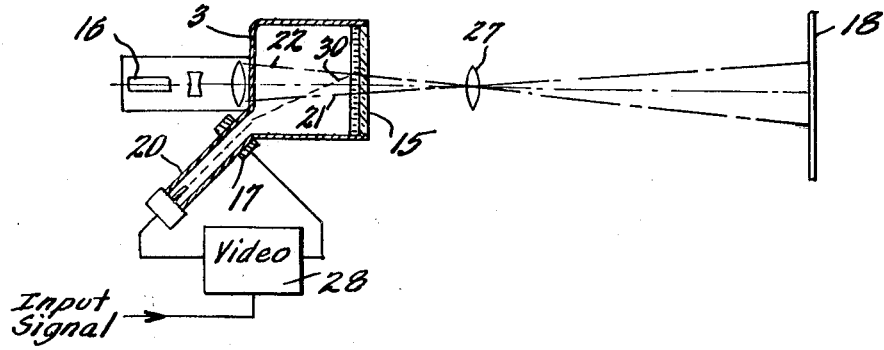
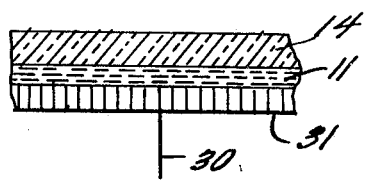
INVENTOR.
O. F. Hamann,
BY
Hatson, Cole, Grindle & Hatson
ATTORNEYS

United States Patent Office 3,498,694
Patented Mar. 3, 1970

3,498,694
OPTICAL INTERFERENCE FILTER MEANS BOMBARDED BY CRT BEAM FOR SELECTIVELY PASSING MONOCHROMATIC LIGHT
Omer F. Hamann, La Jolla, Calif., assignor to Stromberg-Carlson Corporation, Rochester, N.Y., a corporation of Delaware
Filed Sept. 23, 1966, Ser. No. 581,641
Int. Cl. G02f 1/28, 1/36; G01b 9/02
U.S. Cl. 350—160                            5 Claims

ABSTRACT OF THE DISCLOSURE

A light valve is disclosed passing a monochromatic light beam in response to excitation from an electron beam of a cathode ray tube by means of an optical interference filter changing from a wavelength bandpass including the monochromatic beam to one excluding the beam.

---

This invention relates to light valves for selectively passing light rays through electronically designated elemental local positions of a viewing screen, and more specifically, it relates to light valves operable as target screens of a cathode ray tube for selectively passing light to a viewer from a source through elemental areas of the target.

Although various sorts of light valves are known which gate light from a high intensity source in response to electronic signals such as video signals derived in television systems, sonar and radar signals, and computer generated signals, many of these have been shown to be of low optical efficiency, of low resolution, of low reliability, and in some instances slow in operation. Typical light valve devices have depended upon the effect of bombarding an oil film with an electron beam thereby changing the flatness of the film by local electrostatic forces, or the electron bombardment of electro-optic crystals with the field created by the charge causing a local change in index of refraction. This change in index is detected by a polarizer and analyzer; and the operation depends upon the well known Pockles or Kerr effect. Other approaches to light valve operation have been to scratch an opaque film to create an optical window or to effect the orientation of flat particles or flaps by an electric or magnetic field. Still another approach has been to use photochromic materials which respond to ultraviolet light by the generation of absorption bands in the visible spectrum. Also, the generation of F centers to create color images has been used in so called dark trace tubes. In none of the preceding techniques, nor in any other techniques, has the use of optical interference been employed in a light valve.

Accordingly, it is a general object of this invention to provide an improved light valve that makes use of the phenomenon of optical interference locally controlled by electronic signals.

More specifically, it is an object of this invention to provide a light valve operable with small changes in the index of refraction of an optically transparent material or small changes in the physical dimensions of the optically transparent material used in the device.

Another object of the invention is to provide a light valve which can respond to any conventional source of data such as television generated signals, sonar and radar signals, and computer generated signals.

Therefore, in accordance with this invention, there is provided a source of high intensity monochromatic light which is selectively gated by an electronically controlled interference filter.

The operation and characteristics of the invention are set forth in the following specification, together with further objects, features, and advantages, with reference to the accompanying drawings, wherein:

FIGURE 1 is a fragmental section view of a filter used in accordance with this invention;

FIGURE 2 is a spectral response diagram of typical filter characteristics;

FIGURE 3 is a schematic diagram of a typical light valve arrangement utilizing a cathode ray tube; and FIGURE 4 is a fragmental section view of a further filter arrangement.

Dichroic interference filters such as shown in FIGURE 1, are well known in the art as may be seen by reference to Jenkins and White, "Fundamentals of Optics," second edition, McGraw-Hill, p. 275; Vosicek. "Optics of Thin Films," North Holland Publishing Co., 1960, p. 316; or S. Gray Patent 2,873,397. These filters have a transmission response $I_t$ for the incident light $I_0$ peaked at K for a typical wavelength of light $\lambda_0$. The characteristics of filter design are dependent upon the characteristics of thin film 11 of thickness $d$ and refractive index $n$, contained between two partially light transmitting layers 12, 13 of a thin metal film such as gold, silver, aluminum, or other highly reflective material. The partially transmitting layers may also be made from multilay insulating films of alternate high and low index of refraction materials, such as zinc sulfide and magnesium fluoride deposited in alternate quarter wave thicknesses. One of these layers 13 is deposited upon a glass viewing panel 14. The thin film is transparent and can be either liquid such as oil, or may be a solid optical crystal or a thin film of amorphous material formed by vacuum deposition or other techniques.

It is seen from FIGURE 2 that the response of the filter for passing energy can be changed to establish either peak transmission K, defined on the ordinate by the ratio of transmitted light $I_t$ to incident light $I_0$ either at the wavelength $\lambda_0$ of the incident light or at another wavelength $\lambda_t$. Thus, maximum transmission of the wavelength $\lambda_0$ of the incident light is of intensity $b$ which is the substantially opaque condition for the incident light $I_0$ when the response of the filter is at wavelength $\lambda_t$. The two parameters used to change the filter transmission characteristics thus are either or both the thickness $d$ of the film 11 and the index of refraction N of the film 11.

Operation of one type of such filter can be visualized from FIGURE 1, which shows a single thin film layer, but which may comprise additional layers of desired. Assume that an electron beam 30 is absorbed by the layer 11 after passing through the thin metallic film 12. The index of refraction of the layer 11 is caused to change slightly by the introduction of absorption centers which is accompanied by a local region that exhibits anomalous dispersion and therefore an appreciable change in refractive index. This phenomenon is described by F. Seitz, "Modern Theory of Solid," McGraw-Hill Book Co., chapter 18, page 663.

There is also a local change in index of refraction that is due to the presence of the electrostatic field caused by the electron charge from the electron gun. This local change in index is due to the so-called Kerr effect, the Pockles effect, or the change in the polarizability of the optical material is due to the charge. This variation in index of refraction will change the transmission of the monochromatc incident light $\lambda_0$ from the low transmissive state to the high transmissive state by shifting the peak, K, to the left as shown in FIGURE 2. The wavelength $\lambda_0$ of the incident radiation $I_0$ remains constant. The center of the filter bandpass therefore is shifted locally by the electron beam. An unenergized portion of the filter will have its peak response at $\lambda_t$ the under wavelength of the unenergized interference filter.

As seen in FIGURE 4, similar action can be attained by use of elemental electro-strictive rods 31 which change the thickness $d$ of the liquid film 11.

These techniques are incorporated into a light valve arrangement suitable for television viewing, for example, as seen from the configuration of FIGURE 3. The color filter thus in incorporated as the target screen 15 of the cathode ray tube 3. A monochromatic light source 16, such as a laser beam device, is provided to project high intensity light over the entire target screen 15. The cathode ray beam 30 is scanned over the target screen 15 by means of deflection coils 17 under control of a video section 28 which also modulates the beam at cathode 20. A picture or scene may thus be presented for viewing upon the target screen 15 in a conventional manner, but the high intensity gated light source permits projection in magnified form upon a viewing screen 18 by the optical system 27, if desired.

It is to be recognized therefore that the improved light valve afforded by this invention provides rapid and reliable control of high intensity light by use of conventional cathode ray television techniques. Therefore, the features believed descriptive of the nature and scope of the invention are defined with particularity in the appended claims.

What is claimed is:

1. A light valve for gating light over a pattern of local areas identified by a scanning electron beam of a cathode ray tube comprising in combination, a light source providing monochromatic light of wavelength $\lambda$, an optical interference filter positioned in the path of light from said source and positioned as a target screen in the scanning paths of said electron beam, said filter being locally responsive to bombardment of the electron beam to change temporarily in the region of the beam from an unexcited state into an excited state, one of which states transmits light of the wavelength $\lambda$ and the other of which substantially blocks light of the wavelength $\lambda$, means for modulating said beam to provide an intelligible pattern of local regions, and means presenting the light passed by the filter to a viewing plane.

2. A light valve as defined in claim 1 wherein the filter comprises a thin film having its refractive index changed between the excited and unexcited states.

3. A light valve as defined in claim 1 wherein the filter comprises a thin film having its thickness changed between the excited and unexcited states.

4. A light valve comprising in combination, a source of monochromatic light of wavelength $\lambda$, a wavelength responsive interference filter attaining a temporarily excited state in elemental local areas by physical changes from a static state executed by electronic signals presented to said local areas, said filter passing light of said wavelength $\lambda$ in one of said states and effectively blocking said light in the other state, and viewing means disposing the filter in the path of said light to permit viewing the pattern of elemental areas through which the light passes.

5. A light valve as defined in claim 4 wherein the viewing means comprises an optical projection and screen presenting the filter pattern in magnified form on the screen.

References Cited

UNITED STATES PATENTS

| | | | |
|---|---|---|---|
| 2,289,205 | 7/1942 | Nagy et al. | |
| 3,164,665 | 1/1965 | Stello | 88—61 |
| 3,218,390 | 11/1965 | Bramley. | |
| 3,238,843 | 3/1966 | Heller. | |
| 3,317,664 | 5/1967 | Perlowski. | |
| 3,379,998 | 4/1968 | Soules et al. | 331—94.5 |

RONALD L. WIBERT, Primary Examiner

P. K. GODWIN, Jr., Assistant Examiner

U.S. Cl. X.R.

350—311; 356—112